United States Patent
Kim

(10) Patent No.: US 9,166,210 B2
(45) Date of Patent: Oct. 20, 2015

(54) CASE FOR SECONDARY BATTERY AND METHOD OF MANUFACTURING CASE

(75) Inventor: Sungkab Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 819 days.

(21) Appl. No.: 12/835,560

(22) Filed: Jul. 13, 2010

(65) Prior Publication Data

US 2011/0183192 A1  Jul. 28, 2011

(30) Foreign Application Priority Data

Jan. 26, 2010  (KR) .................. 10-2010-0007041

(51) Int. Cl.
*H01M 2/02* (2006.01)
*C25D 11/12* (2006.01)
*C25D 11/10* (2006.01)
*C25D 11/24* (2006.01)

(52) U.S. Cl.
CPC ............. *H01M 2/0285* (2013.01); *C25D 11/10* (2013.01); *C25D 11/12* (2013.01); *C25D 11/243* (2013.01); *C25D 11/246* (2013.01); *H01M 2/0275* (2013.01); *H01M 2/0277* (2013.01); *H01M 2/0287* (2013.01)

(58) Field of Classification Search
CPC ............ H01M 2/0285; H01M 2/0275; H01M 2/0287; C25D 11/12; C25D 11/10; C25D 11/246; C25D 11/243; C25D 11/0277
USPC ......... 429/122, 129, 149, 156, 163, 178, 185, 429/400
See application file for complete search history.

(56) References Cited

U.S. PATENT DOCUMENTS

| | | | | | |
|---|---|---|---|---|---|
| 3,016,293 | A | * | 1/1962 | Cybriwsky et al. | 8/485 |
| 3,079,309 | A | * | 2/1963 | Wainer | 205/202 |
| 3,293,895 | A | * | 12/1966 | Kohan et al. | 72/46 |
| 4,375,391 | A | * | 3/1983 | Kushida et al. | 205/121 |
| 4,567,121 | A | | 1/1986 | Gilmour | |
| 4,606,796 | A | * | 8/1986 | Hanazima et al. | 205/202 |
| 5,037,449 | A | * | 8/1991 | Hoegerle et al. | 8/549 |

(Continued)

FOREIGN PATENT DOCUMENTS

| | | | | | |
|---|---|---|---|---|---|
| JP | 49002739 | | * | 1/1974 | C25D 11/20 |
| JP | 2006-302662 | | * | 11/2006 | H01M 2/10 |

(Continued)

OTHER PUBLICATIONS

Christoph et al. (Clays and Clay Minerals vol. 27 No. 2 pp. 81-86 1979).*

(Continued)

*Primary Examiner* — Patrick Ryan
*Assistant Examiner* — Aaron Greso
(74) *Attorney, Agent, or Firm* — Christie, Parker & Hale, LLP

(57) ABSTRACT

A case for a secondary battery and a method of manufacturing the case. The case has improved hardness and insulating properties and can be colored or patterned according to customers' preferences without having to perform an additional painting process, and a method of manufacturing the case. The case includes a body configured to accommodate an electrode assembly and formed of a conductive material; an oxide film formed on the body; and a colored sealing layer formed on the oxide film.

4 Claims, 4 Drawing Sheets

(56) References Cited

U.S. PATENT DOCUMENTS

| | | | |
|---|---|---|---|
| 6,809,928 B2* | 10/2004 | Gwin et al. | 361/699 |
| 2005/0126434 A1* | 6/2005 | Feldkamp | 106/31.43 |
| 2007/0184292 A1 | 8/2007 | Lee et al. | |
| 2008/0057280 A1 | 3/2008 | Watanabe et al. | |
| 2009/0038946 A1* | 2/2009 | Ohmi et al. | 205/95 |
| 2009/0176147 A1* | 7/2009 | Hatanaka et al. | 429/94 |
| 2009/0269654 A1* | 10/2009 | Kairawicz et al. | 429/56 |

FOREIGN PATENT DOCUMENTS

| | | | | |
|---|---|---|---|---|
| JP | 2006/0134737 | * | 12/2006 | C25D 11/04 |
| KR | 92-010628 B1 | | 12/1992 | |
| KR | 1020060114839 | * | 8/2006 | H01M 2/02 |
| KR | 10-2006-0114839 | | 11/2006 | |
| KR | 10-0682962 B1 | | 2/2007 | |
| WO | WO 2006/134737 | * | 12/2006 | C25D 11/18 |
| WO | WO 2007/072833 | * | 6/2007 | H01M 4/02 |

OTHER PUBLICATIONS

Dupont MSDS Viton Fluoroelastomer REV date Mar. 22, 2010.*
Discovering the Universe American Museum of Natural History NASA Charles Hayden Foundation 2002.*
Harness Real Dictionary Princeton Univ Princeton NJ 2001 Available May 2003.*
Viton Fluoroelastomer Dupont MSDS Revision Aug. 18, 2006.*
Dye Real Dictionary Princeton Univ Princeton NJ 2001 Available May 26, 2003.*
Ashland MSDS Barium Sulfate Jun. 22, 1999.*
Dorsey JR (Journal of the Electrochemical Society, vol. 113 No. 2 Feb. 1966 pp. 172-176).*
Merriam-Webster (Merriam-Webster Online Dictionary printed Sep. 22, 2014 {http://www.merriam-webster.com/dictionary/plate}).*
The Metal Worker (The Metal Worker p. 40 Apr. 14, 1864 vol. 41).*
Aluminum Anodizers Council (see Organic Dyeing section p. 4 and "sealing" definition on p. 6 {http://www.anodizing.org/Anodizing/processes.html} Jul. 3, 2008).*
Alibaba 1907810214-LD-928-solvent-dispers {http://au.alibaba.com/product/1907810214-LD-928-solvent-dispersing-agent-producer.html printed Feb. 11, 2015.*
TrueArtInfo pigments and dyes (C) 2001 modified Feb. 21, 2009 {http://www.lrueartinfo/painls.hlm}.*
Office action dated Apr. 25, 2011 for corresponding Korean Patent Application No. 10-2010-0007041.
KIPO Office action dated Apr. 20, 2011, for Korean Patent application 10-2010-0007039, (4 pages).
U.S. Office action dated Mar. 17, 2011, for cross reference U.S. Appl. No. 12/805,532, (9 pages).
U.S. Office action dated Sep. 14, 2011, for cross reference U.S. Appl. No. 12/805,532, (8 pages).
U.S. Office action dated Jan. 9, 2012, for cross reference U.S. Appl. No. 12/805,532, (7 pages).
Alwitt, Robert S., *Anodizing*, Electrochemistry Encyclopedia, Dec. 2002, http://electrochem.cwru.edu/encycl/; world wide web, retrieved Mar. 10, 2011, 13 pages.

* cited by examiner

CASE FOR SECONDARY BATTERY AND METHOD OF MANUFACTURING CASE

CROSS-REFERENCE TO RELATED APPLICATION

This application claims priority to and the benefit of Korean Patent Application No. 10-2010-0007041, filed on Jan. 26, 2010, in the Korean Intellectual Property Office, the entire content of which is incorporated herein by reference.

BACKGROUND

1. Field

The following description relates to a case for a secondary battery and a method of manufacturing the case.

2. Description of the Related Art

Unlike primary batteries that are not rechargeable, secondary batteries are rechargeable and widely used in electronic devices such as cellular phones, PDAs, and laptop computers. Particularly, lithium ion secondary batteries have operating voltage of 3.6 V which is three times higher than the operating voltage of nickel-cadmium or nickel-hydrogen batteries that are widely used as power sources of electronic equipment, and the use of lithium ion secondary batteries is rapidly increased owing to their high energy density per weight.

In addition, as compared with other secondary batteries, lithium ion secondary batteries have high output power, high capacity, and low weight, and thus they are also used in internal combustion engine vehicles, hybrid electric vehicles, or electric vehicles.

In addition, lithium-containing oxides are usually used as positive electrode active materials of lithium ion secondary batteries, and carbon is usually used as negative electrode active materials of lithium ion secondary batteries. Lithium ion secondary batteries are manufactured with various shapes such as cylindrical shapes, prismatic shapes, and pouch shapes. A lithium ion secondary battery includes an electrode assembly and a conductive case in which the electrode assembly is accommodated.

SUMMARY

An aspect of an embodiment of the present invention is directed toward a secondary battery with improved hardness and insulating properties and can be colored or patterned according to customers' preferences without having to perform an additional painting process, and a method of manufacturing the case.

According to an embodiment of the present invention, there is provided a case for a secondary battery, the case including: a body configured to accommodate an electrode assembly and composed of a conductive material; an oxide film on the body; and a colored sealing layer on the oxide film.

In one embodiment, the body includes an aluminum plate composed of aluminum or an aluminum alloy, and the oxide film is an aluminum oxide film formed on the aluminum plate by electrochemically treating the aluminum plate in a state where the aluminum plate is immersed in an adipic acid solution. In one embodiment, the electrochemical treatment in the adipic acid solution is performed in which: molarity of the adipic acid solution is in a range from about 0.5 M to about 1.5 M; processing temperature is in a range from about 60° C. to about 80° C.; and processing voltage is in a range from about 100 V to about 150 V. In one embodiment, the aluminum plate is mechanically hardened by thickening the aluminum oxide film with an electrochemical treatment in a boric acid solution. In one embodiment, the electrochemical treatment in the boric acid solution is performed in which: molarity of the boric acid solution is in a range from about 0.5 M to about 2.0 M; processing temperature is in a range from about 60° C. to about 80° C.; and processing voltage is in a range from about 250 V to about 500 V.

In one embodiment, the colored sealing layer is composed of organic materials having a plurality of colors so that the colored sealing layer has a plurality of colors or a plurality of patterns.

In one embodiment, the body with the oxide film and the colored sealing layer is configured to accommodate a high-capacity or high-power battery.

In one embodiment, the body with the oxide film and the colored sealing layer is configured to accommodate a hybrid electric vehicle or an electric vehicle.

In one embodiment, the oxide film is configured to increase mechanical hardness of the case, and the colored sealing layer is configured to fill fine pores of the oxide film.

According to another embodiment of the present invention, there is provided a method of manufacturing a case of a secondary battery, the method including: immersing a body formed of a conductive material in an oxidizing solution; forming an oxide film on the body by performing an electrochemical treatment on the body in a state where the body is immersed in the oxidizing solution; and forming a colored sealing layer on the oxide film using a colored organic material.

In one embodiment, the forming of the colored sealing layer is performed using a plurality of organic materials having a plurality of colors so that the colored sealing layer has a plurality of colors or a plurality of patterns.

In one embodiment, the forming of the oxide film comprises increasing mechanical hardness of the case, and the forming of the colored sealing layer comprises filling fine pores of the oxide film.

According to another embodiment of the present invention, there is provided a method of manufacturing a case of a secondary battery, the method including: immersing an aluminum plate in an adipic acid solution; forming an aluminum oxide film on the aluminum plate by performing an electrochemical treatment on the aluminum plate in a state where the aluminum plate is immersed in the adipic acid solution; and forming a colored sealing layer on the aluminum oxide film using a colored organic material.

In one embodiment, the forming of the aluminum oxide film, the electrochemical treatment in the adipic acid solution is performed in which: molarity of the adipic acid solution is in a range from about 0.5 M to about 1.5 M; processing temperature is in a range from about 60° C. to about 80° C.; and processing voltage is in a range from about 100 V to about 150 V.

In one embodiment, between the forming of the aluminum oxide film and the forming of the colored sealing layer, the method further comprises: immersing the aluminum plate on which the aluminum oxide film is formed into a boric acid solution; and thickening the aluminum oxide film by performing an electrochemical treatment in a state where the aluminum plate is immersed in the boric acid solution. In one embodiment, in the thickening of the aluminum oxide film, the electrochemical treatment in the boric acid solution is performed in which: molarity of the boric acid solution is in a range from about 0.5 M to about 2.0 M; processing temperature is in a range from about 60° C. to about 80° C.; and processing voltage is in a range from about 250 V to about 500 V.

In one embodiment, the forming of the colored sealing layer is performed using a plurality of organic materials having a plurality of colors so that the colored sealing layer has a plurality of colors or a plurality of patterns.

In one embodiment, after the forming of the colored sealing layer, the method further comprises forming the aluminum plate into a shape for accommodating the secondary battery.

In one embodiment, prior to the immersing of the aluminum plate in the adipic acid solution, the method further comprises forming the aluminum plate into a shape for accommodating the secondary battery. In one embodiment, the forming of the aluminum oxide film includes increasing mechanical hardness of the case, and the forming of the colored sealing layer includes filling fine pores of the aluminum oxide film.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain principles of the present disclosure. In the drawings.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the disclosure to those skilled in the art.

Figure 1:
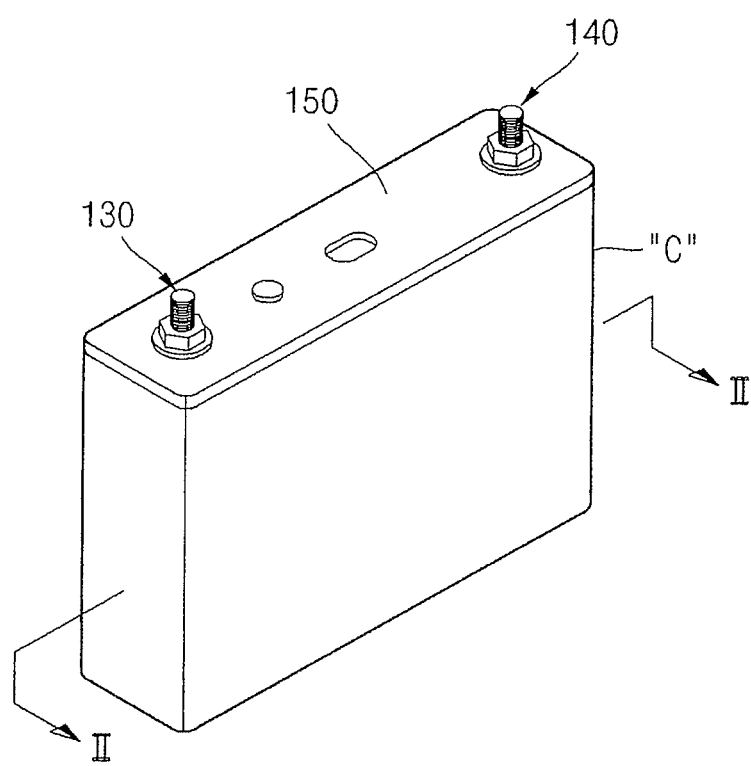
FIG. 1 illustrates a perspective view of a secondary battery case and an electrode assembly accommodated in the case according to an embodiment of the present invention.
Figure 2:
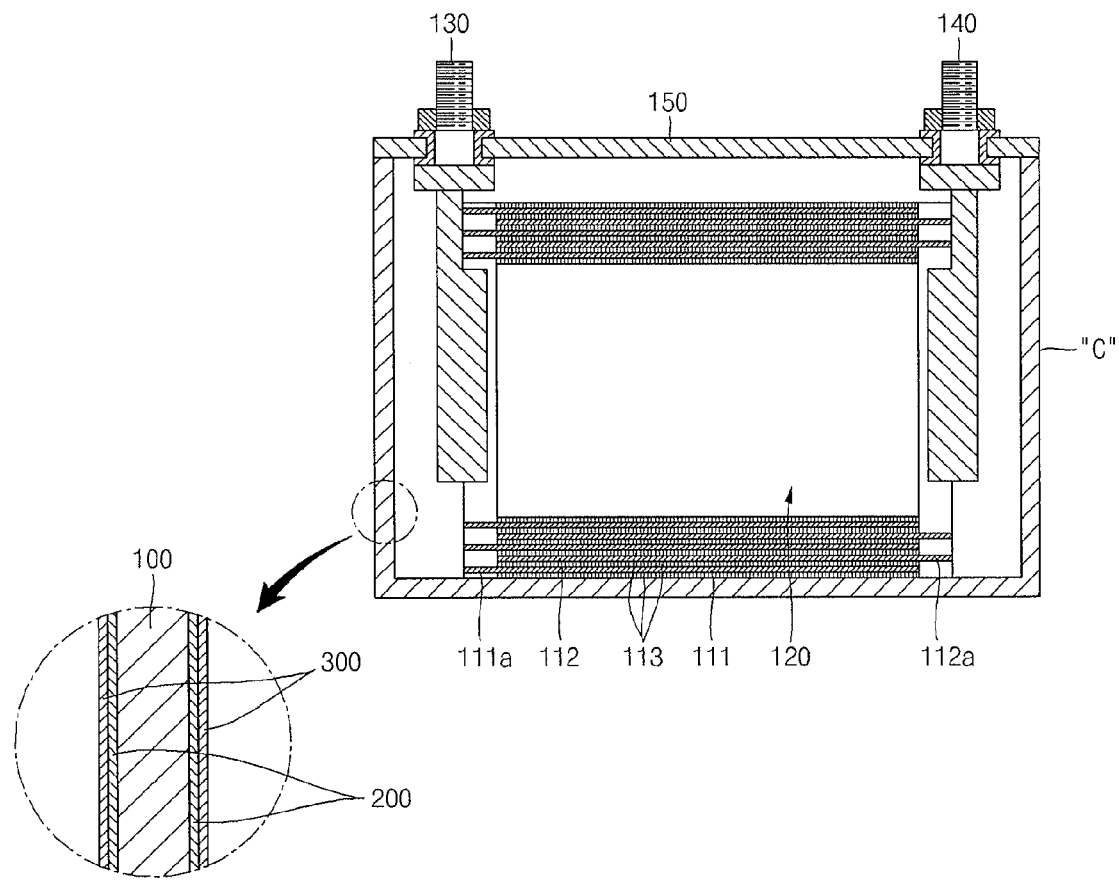
FIG. 2 illustrates a schematic sectional view taken along line II-II of FIG. 1, to show the secondary battery case according to an embodiment of the present invention.

FIG. 1 illustrates a perspective view of a secondary battery case and an electrode assembly accommodated in the case according to an embodiment of the present invention, and FIG. 2 illustrates a schematic sectional view taken along line II-II of FIG. 1, to show the secondary battery case according to an embodiment of the present invention.

According to an embodiment of the present invention, as shown in FIGS. 1 and 2, a case (C) for a secondary battery includes a body 100 configured to accommodate an electrode assembly 120, oxide films 200, and colored sealing layers 300.

The electrode assembly 120 includes positive plates 111, negative plates 112, and separators 113 as main elements for charging and discharging operations. The positive plates 111 and the negative plates 112 are stacked with the separators 113 being disposed therebetween. Hereinafter, with reference to FIG. 1, elements of the electrode assembly 120 will be described in more detail.

The positive plates 111 include positive electrode collectors formed of highly-conductive metal thin plates such as aluminum foil, and positive electrode active materials formed on sides (e.g., both sides) of the highly-conductive metal thin plates. Also, in the positive plates 111, ends (e.g., both ends) of the highly-conductive metal thin plates are not coated with positive active materials. That is, positive electrode non-coating portions 111a are located on both ends of the positive plates 111. A positive terminal 130 is coupled to ends of the positive electrode non-coating portions 111a. The positive terminal 130 is usually formed of aluminum and is protruded from the electrode assembly 120.

The negative plates 112 include negative electrode collectors formed of conductive metal thin plates such as copper or nickel foil, and negative electrode active materials formed on sides (e.g., both sides) of the conductive metal thin plates. Also, in the negative plates 112, ends (e.g., both ends) of the conductive metal thin plates are not coated with negative active materials. That is, negative electrode non-coating portions 112a are located on both ends of the negative plates 112. A negative terminal 140 is coupled to ends of the negative electrode non-coating portions 112a. The negative terminal 140 is usually formed of nickel and is protruded from the electrode assembly 120.

The separators 113 prevent or protect form short circuits between the positive plates 111 and the negative plates 112 and may be formed of a porous polymer film to transmit lithium ions.

The body 100 is configured to accommodate the electrode assembly 120. The body 100 has a plate shape and is formed of a conductive material. The plate-shaped body 100 may be formed in a cylindrical shape, a prismatic shape, or a pouch shape according to the shape of a battery. For example, the body 100 may be an aluminum-based aluminum plate formed of aluminum or an aluminum alloy.

The oxide films 200 are formed on the surfaces of the body 100. Particularly, in the case where the body 100 is formed of an aluminum plate (hereinafter, denoted by the same reference numeral 100 as the reference numeral 100 used to denote the body), the oxide films 200 may be aluminum oxide films (hereinafter, denoted by the same reference numeral 200 as the reference numeral 200 used to denote the oxide films). Hereinafter, the aluminum oxide films 200 will be described in more detail.

The aluminum oxide films 200 may be formed on the surfaces of the aluminum plate 100 by electrochemically treating the aluminum plate 100 in a state where the aluminum plate 100 is immersed in an adipic acid solution. That is, the aluminum oxide films 200 may be formed by oxidizing the surfaces of the aluminum plate 100. For example, conditions for the electrochemical treatment in an adipic acid solution may be as follows. Molarity of adipic acid solution: about 0.5 M to about 1.5 M, processing temperature: about 60° C. to about 80° C., and processing voltage: about 100 V to about 150 V.

If the molarity of the adipic acid solution is lower than about 0.5 M, oxidation may be insufficient due to the low concentration of the adipic acid, and thus desired hardness (about 350 Hv to about 450 Hv) and insulating properties may not be obtained. On the other hand, if the molarity of the adipic acid solution is higher than about 1.5 M, costs may be increased due to the excessive amount of adipic acid that does not participate in oxidation. In addition, if the processing temperature is lower than about 60° C., oxidation may be insufficient, and thus desired hardness and insulating properties may not be obtained. On the other hand, if the processing temperature is higher than about 80° C., costs may be increased due to unnecessary heating that has no influence on oxidation. In addition, if the processing voltage is lower than about 100 V, oxidation may be insufficient, and thus desired hardness and insulating properties may not be obtained. On the other hand, if the processing voltage is higher than about 150 V, costs may be increased due to an unnecessary increase of voltage that has no influence on oxidation.

Particularly, although the Vickers hardness of an aluminum plate is generally in the range from about 160 Hv to 170 Hv, the Vickers hardness of the aluminum plate 100 can be in the range from about 350 Hv to about 450 Hv if the aluminum oxide films 200 are formed on the surfaces of the aluminum plate 100. This was confirmed by an experiment. In addition, in the case where the secondary battery case (C) of the current embodiment has a hardness in the above-mentioned range, the embodiment can pass various suitable reliability tests such as a vibration test and a mechanical impact test, and safety tests such as a penetration test, a collision test, and an impact test. Furthermore, since the Vickers hardness of the case (C) is high, the case (C) is durable to counter against deformation such as swelling. Furthermore, since the case (C) becomes non-conductive due to the aluminum oxide films 200, the case (C) may be accidentally brought into contact with the positive electrode non-coating portions 111a or the negative electrode non-coating portions 112a without creating a short circuit.

Therefore, the secondary battery case (C) of the current embodiment can provide sufficient safety even when the case (C) is used as a case of a high-capacity or high-power battery. Particularly, the secondary battery case (C) of the current embodiment can provide sufficient safety even when the case (C) is used as a battery case of an internal combustion engine vehicle, a hybrid electric vehicle, or an electric vehicle which is exposed to extreme environments such as continuous road impacts and collision with other objects. Hereinafter, the colored sealing layers 300 formed on the aluminum oxide films 200 will be described in more detail.

The colored sealing layers 300 are formed to fill a number of fine pores of the aluminum oxide films 200 and to improve the aesthetics of the case (C). That is, the colored sealing layers 300 prevent or protect from the possibility of an electric current flow to the aluminum plate 100 through the fine pores of the aluminum oxide films 200, and since the colored sealing layers 300 are formed of an organic material (i.e., the colored sealing layers 300 have a color), the aesthetics of the case (C) can be improved. Particularly, since current customers place much emphasis on visual designs and have much interest on the external appearance of the case (C), if the case (C) can be sealed and beautifully finished at one time through a sealing layer forming process without having to perform an additional finishing process, manufacturing processes can be reduced, and thus manufacturing costs and time can be considerably reduced.

The colored sealing layers 300 may be formed of a colored organic material such as a colored synthetic resin or colored ethylene propylene diene Monomer rubber (EPDM).

After the aluminum oxide films 200 are formed on the aluminum plate 100, the colored sealing layers 300 may be formed by applying a colored organic material to the aluminum plate 100 or immersing the aluminum plate 100 in a colored organic material. To improve the aesthetics using various suitable colors or patterns, a colored organic material mixed with dyes of various suitable colors may be used to form the colored sealing layers 300.

Hereinafter, with reference to FIG. 3, a detailed explanation will be given on a method of manufacturing the above-described secondary battery case according to an embodiment of the present invention.

Figure 3:
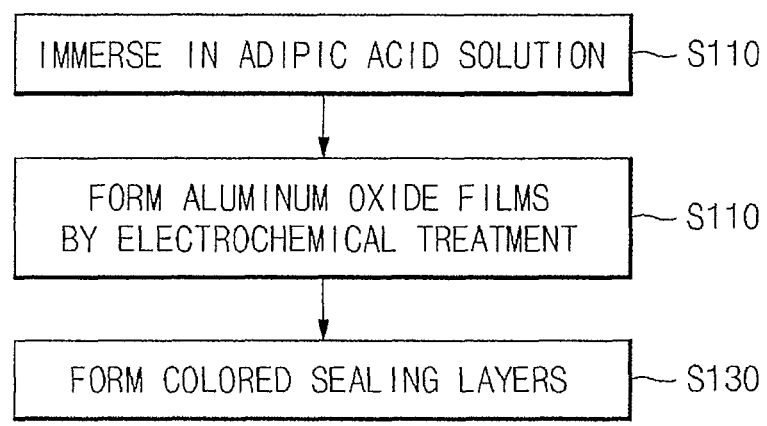
FIG. 3 illustrates a flowchart for a method of manufacturing a secondary battery case according to an embodiment of the present invention.

FIG. 3 illustrates a flowchart for a method of manufacturing a secondary battery case according to an embodiment of the present invention.

First, an aluminum plate 100 is immersed in an adipic acid solution (S110).

In a state where the aluminum plate 100 is immersed in the adipic acid solution, electrochemical treatment is performed on the aluminum plate 100 to form aluminum oxide films 200 on the surfaces of the aluminum plate 100, that is, the surfaces of the aluminum plate 100 are oxidized to form the aluminum oxide films 200 (S120). At this time, conditions for the electrochemical treatment in the adipic acid solution may be as follows. Molarity of adipic acid solution: about 0.5 M to about 1.5 M, processing temperature: about 60° C. to about 80° C., and processing voltage: about 100 V to about 150 V. Since these exemplary conditions have been explained in the above description, descriptions thereof will not be repeated.

Thereafter, colored sealing layers 300 are formed on the aluminum oxide films 200 using a colored organic material so as to seal the aluminum oxide films 200 and form aesthetic appearance according to customers' demands (S130). At this time, the colored sealing layers 300 may be formed by applying a colored organic material to the aluminum plate 100 or immersing the aluminum plate 100 in a colored organic material after the aluminum oxide films 200 are formed on the aluminum plate 100. To satisfy customers' demands more exactly by applying various suitable colors or patterns to the colored sealing layers 300, a colored organic material mixed with dyes of various suitable colors may be used for coating or immersing the aluminum plate 100.

Thereafter, the aluminum plate 100 on which the aluminum oxide films 200 and the colored sealing layers 300 are formed is formed in a certain or predetermined shape by an impact method and/or a deep drawing method. The predetermined shape may be one of a cylindrical shape, a prismatic shape, and a pouch shape according to the shape of a battery. In another example, the aluminum plate 100 may be formed in the predetermined shape before the aluminum oxide films 200 are formed by immersion in an adipic acid solution. In this case, since the aluminum oxide films 200 are not formed, the aluminum plate 100 may be easily formed into the predetermined shape without concern about damages on the aluminum oxide films 200, and thus manufacturing time can be reduced.

On the other hand, in another embodiment of the present invention, a secondary battery case is electrochemically treated in a boric acid solution so as to increase the thickness of aluminum oxide films 200 that are already formed. Except for this, the embodiment is the same as the previous embodiment, and thus electrochemical treatment in a boric acid solution will be mainly described hereinafter.

In a state where aluminum oxide films 200 are formed using an adipic acid solution, electrochemical treatment in a boric acid solution may be further performed to increase the Vickers hardness of an aluminum plate 100 by thickening the aluminum oxide films 200. In the case, conditions for the electrochemical treatment in a boric acid solution may be as follows. Molarity of boric acid solution: about 0.5 M to about 2.0 M, processing temperature: about 60° C. to about 80° C., and processing voltage: about 250 V to about 500 V.

If the molarity of the boric acid solution is lower than about 0.5 M, oxidation may be insufficient due to the low concentration of the boric acid, and if the molarity of the boric acid solution is higher than about 2.0 M, costs may be increased due to the excessive amount of boric acid that does not participate in oxidation.

In addition, if the processing temperature is lower than about 60° C., oxidation may be insufficient, and if the processing temperature is higher than about 80° C., costs may be increased due to unnecessary heating that has no influence on oxidation.

In addition, if the processing voltage is lower than about 250 V, oxidation may be insufficient, and if the processing voltage is higher than about 500 V, costs may be increased due to an unnecessary increase of voltage that has no influence on oxidation.

Hereinafter, with reference to FIG. 4, an explanation will be given on a method of manufacturing the secondary battery case according to another embodiment described above.

Figure 4:
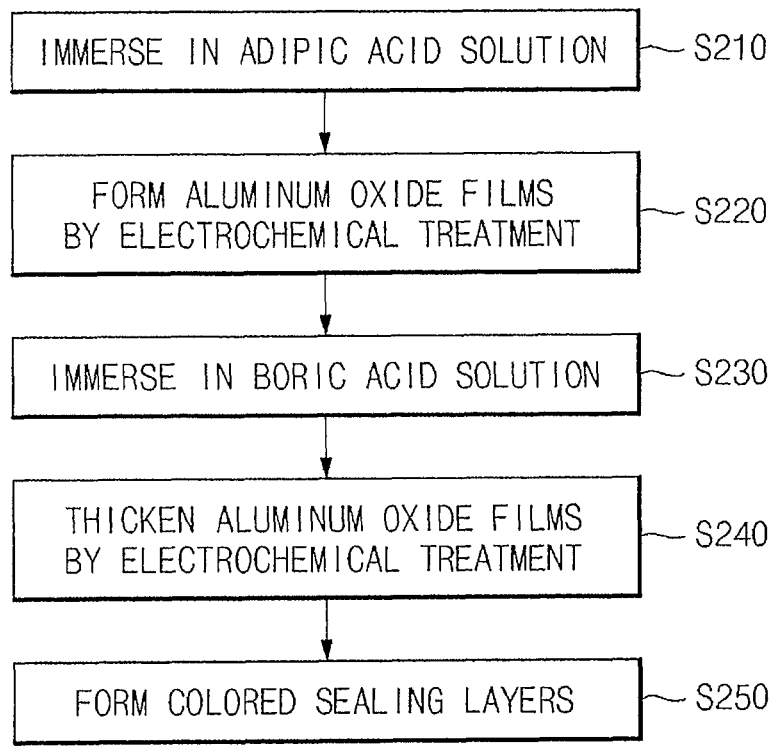
FIG. 4 illustrates a flowchart for a method of manufacturing a secondary battery case according to another embodiment of the present invention.

FIG. 4 illustrates a flowchart for a method of manufacturing a secondary battery case according to another embodiment of the present invention.

First, an aluminum plate 100 is immersed in an adipic acid solution (S210).

In a state where the aluminum plate 100 is immersed in the adipic acid solution, electrochemical treatment is performed on the aluminum plate 100 to form aluminum oxide films 200 on the surfaces of the aluminum plate 100, that is, the surfaces of the aluminum plate 100 are oxidized to form the aluminum oxide films 200 (S220). At this time, conditions for the electrochemical treatment in the adipic acid solution may be as follows. Molarity of adipic acid solution: about 0.5 M to about 1.5 M, processing temperature: about 60° C. to about 80° C., and processing voltage: about 100 V to about 150 V. Since these exemplary conditions have been explained in the above description, descriptions thereof will not be repeated.

Thereafter, the aluminum plate 100 on which the aluminum oxide films 200 are formed is immersed in a boric acid solution (S230).

In a state where the aluminum plate 100 is immersed in the boric acid solution, electrochemical treatment is performed to increase the thickness of the aluminum oxide films 200 (S240). At this time, conditions for the electrochemical treatment in the boric acid solution may be as follows. Molarity of boric acid solution: about 0.5 M to about 2.0 M, processing temperature: about 60° C. to about 80° C., and processing voltage: about 250 V to about 500 V. Since these exemplary conditions have been explained in the above description, descriptions thereof will not be repeated.

Thereafter, colored sealing layers 300 are formed on the aluminum oxide films 200 using a colored organic material so as to seal the aluminum oxide films 200 and to form the desired aesthetic appearance according to customers' demands (S130). Here, the colored sealing layers 300 may be formed by applying a colored organic material to the aluminum plate 100 or immersing the aluminum plate 100 in a colored organic material after the aluminum oxide films 200 are formed on the aluminum plate 100. To satisfy customers' demands more exactly by applying various suitable colors or patterns to the colored sealing layers 300, a colored organic material mixed with dyes of various suitable colors may be used for coating or immersing the aluminum plate 100.

Thereafter, the aluminum plate 100 on which the aluminum oxide films 200 and the colored sealing layers 300 are formed is formed in a set or predetermined shape by an impact method and/or a deep drawing method. The predetermined shape may be one of a cylindrical shape, a prismatic shape, and a pouch shape according to the shape of a battery. In another example, the aluminum plate 100 may be formed in the predetermined shape before the aluminum oxide films 200 (for example, crystalline barrier aluminum oxide films) are formed by immersion in an adipic acid solution. In this case, since the crystalline barrier aluminum oxide films 200 are not formed, the aluminum plate 100 may be easily formed into the preset shape without concern about damages on the crystalline barrier aluminum oxide films 200, and thus manufacturing time can be reduced.

As described in the above embodiments, according to the secondary battery case and the method of manufacturing the case, the following effects may be obtained.

According to embodiments of the present invention, since the aluminum oxide films 200 are formed on the aluminum plate 100 of the case (C), the hardness of the case (C) can be increased, and thus when the case (C) supports the electrode assembly 120, structural safety can be ensured.

In addition, according to embodiments of the present invention, since the colored sealing layers 300 are formed on the aluminum oxide films 200, fine pores of the aluminum oxide films 200 can be filled with the colored sealing layers 300 to improve insulating properties. Particularly, even if the case (C) is accidentally brought into contact with the electrode assembly 120 by an external force, a short circuit or corrosion can be prevented.

In addition, according to an embodiment, since the colored sealing layers 300 filling the fine pores of the aluminum oxide films 200 have color(s), colors or patterns can be applied to the surface of the case (C) according to customers' preferences without having to perform an additional painting process. Particularly, since current customers place much emphasis and/or interest on visual designs and/or external appearances of the case (C), if the case (C) can be sealed and beautifully finished at one time through a sealing layer forming process without having to perform an additional finishing process, manufacturing processes can be reduced, and thus manufacturing costs and time can be considerably reduced.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A case for a secondary battery, the case comprising:
   a body configured to accommodate an electrode assembly and composed of a conductive material;
   an oxide film on the body, the oxide film being on two oppositely facing-away surfaces of the body; and
   a colored sealing layer on the oxide film, the colored sealing layer comprising a dye to provide the color of the colored sealing layer,
   wherein the colored sealing layer is on two oppositely facing-away surfaces of the body,
   wherein the colored sealing layer is composed of organic materials having a plurality of colors to provide the colored sealing layer with the plurality of colors or a plurality of patterns,
   wherein:
      the body comprises an aluminum plate composed of aluminum or an aluminum alloy, and
      the oxide film is an aluminum oxide film formed on the aluminum plate by electrochemically treating the aluminum plate in a state where the aluminum plate is immersed in an adipic acid solution,
   wherein the electrochemical treatment in the adipic acid solution is performed in which:
      molarity of the adipic acid solution is in a range from about 0.5 M to about 1.5 M;
      processing temperature is in a range from about 60° C. to about 80° C.; and processing voltage is in a range from about 100 V to about 150 V wherein the aluminum plate is mechanically hardened by thickening the aluminum oxide film with an electrochemical treatment in a boric acid solution wherein the electrochemical treatment in the boric acid solution is performed in which:
  molarity of the boric acid solution is in a range from about 0.5 M to about 2.0 M;
  processing temperature is in a range from about 60° C. to about 80° C.; and
  processing voltage is in a range from about 250 V to about 500 V, wherein the oxide film is configured to increase mechanical Vickers hardness of the case, and the colored sealing layer is configured to fill pores of the oxide film, wherein the Vickers hardness of the case is configured to be from about 350 Hv to about 450 Hv.

2. A vehicle comprising a battery comprising the case of claim 1, wherein the vehicle is selected from the group consisting of internal combustion engine vehicles, hybrid electric vehicles, and electric vehicles.

3. The case of claim 1, wherein the body with the oxide film and the colored sealing layer is configured to accommodate a hybrid electric vehicle or an electric vehicle.

4. The case of claim 1, further comprising another oxide film formed between the oxide film and the colored sealing layer.

* * * * *